F. F. SAYLES.
TICKET HOLDER.
APPLICATION FILED MAY 27, 1908.
934,220.
Patented Sept. 14, 1909.
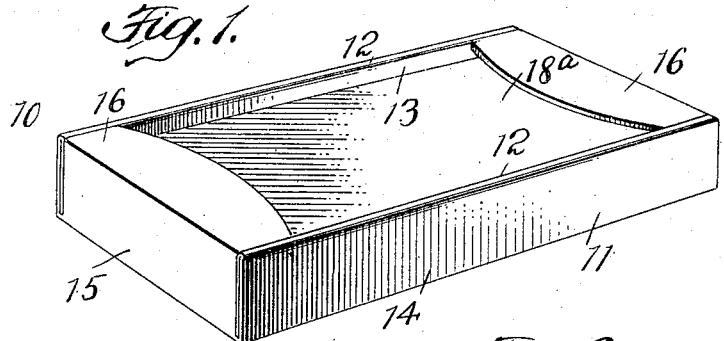
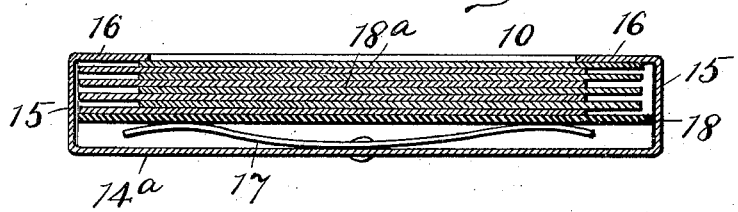
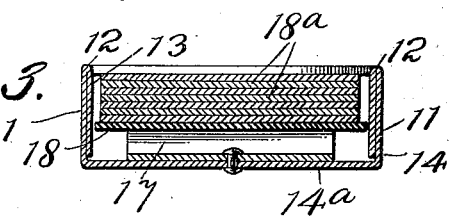
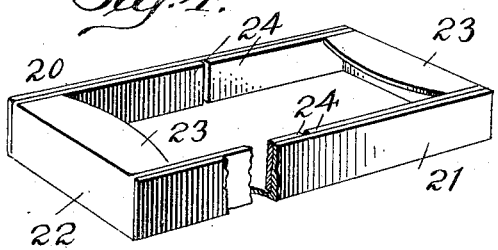 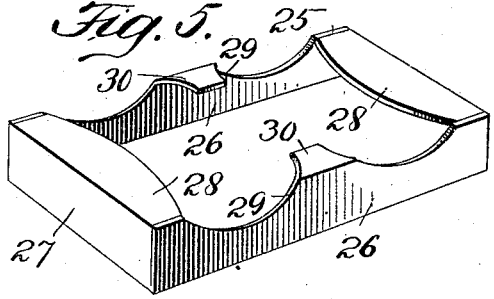
WITNESSES:
INVENTOR
Frank F. Sayles
BY
Criswell & Criswell
ATTORNEYS

UNITED STATES PATENT OFFICE.

FRANK F. SAYLES, OF NEW YORK, N. Y.

TICKET-HOLDER.

934,220.

Specification of Letters Patent. Patented Sept. 14, 1909.

Application filed May 27, 1908. Serial No. 435,242.

*To all whom it may concern:*

Be it known that I, FRANK F. SAYLES, a citizen of the United States, and a resident of New York, county and State of New York, have invented certain new and useful Improvements in Ticket-Holders, of which the following is a full, clear, and exact description.

This invention relates more particularly to a holder for railway passenger tickets.

The primary object of the invention is to provide a simple and efficient device which will hold a number of tickets in such a way that the tickets may be readily removed successively from the holder, and to provide a holder which may be readily formed from sheet metal and so shaped as to permit the tickets to be readily inserted or removed therefrom.

A further object of the invention is to provide a simple and efficient device in which a follower plate is provided so as to force the tickets outward as others are removed.

With these and other objects in view, the invention will be hereinafter more particularly described with reference to the accompanying drawings which form a part of this specification, and will then be pointed out in the claims at the end of the description.

In the drawings, Figure 1 is a perspective view of one form of device embodying my invention. Fig. 2 is a longitudinal section. Fig. 3 is a transverse section. Fig. 4 is a perspective view of a form of casing which may be employed; and Fig. 5 is still another form of casing.

The casing 10 may have side-pieces 11 which are bent over and inward so as to provide a smooth upper edge 12, the inner member 13 of which lies close to the outer member 14, and said casing has end-pieces 15 projecting from the bottom 14ª and with overhanging portions 16. It will be observed from the drawings that the sides are bent up against the edges of said end pieces. Within the casing and secured to the bottom 14ª is a spring element 17, and adapted to be forced upward by the spring element is a follower plate 18 which is adapted to fit within the casing and on which the tickets, as 18ª, are adapted to rest and be supported. The spring element 17 may comprise one or more members, and is of sufficient tension to force the plate 18 upward to carry the tickets placed on the plate or follower plate 18 against the overhanging portions 16. The tickets are so placed within the casing that one ticket will extend under one of the overhanging portions 16, and the next ticket will extend under the other overhanging portions 16 thus alternating as shown more clearly in Fig. 2. When it is desired to remove the ticket, the upper ticket is slipped back slightly so that one end will be free of one of the overhanging portions 16 when it may be readily forced by the thumb free of the casing, and the next ticket is removed by reversing the casing and first forcing one end free of the engaging overhanging portion and then sliding the ticket by means of the thumb outward. The casing may be of a size to hold any desired number of tickets, and the tickets may be placed therein according to the method described for removing the same.

In Fig. 4 the casing, similar to that of Fig. 1 is formed from a single piece of metal. As shown the body 20 has its sides 21 and end-pieces 22. Each end-piece is provided with an overhanging portion 23 and with inwardly-extending parts 24 which lie close to the sides 21 and form guides for the tickets when placed within the casing.

The construction shown in Fig. 5 is slightly different from that of the other figures, and has its body portion 25 provided with sides 26 and ends or end-pieces 27. Each end-piece 27 has an overhanging portion 28, and the sides 26 are cut away as at 29, and are also provided with overhanging parts 30 serving to further hold the tickets when placed within the casing or body.

From the foregoing it will be seen that a simple and efficient casing is provided in which a plurality of tickets may be arranged within the same in such a way that the tickets may be removed successively from the casing; that the casing of the said device may be made of a single piece of metal and so constructed as to properly present the tickets in position for removal, and that said device forms a compact and convenient means for holding tickets.

Having thus described my invention, I claim as new and desire to secure by Letters Patent:—

1. A box of the character described, comprising a metal casing having side walls and end walls, the latter being provided with overhanging portions, the metal forming said side walls being doubled upon itself and bent up against the edges of said end walls, and a follower located in said box.

2. A box of the character described, comprising a metal casing having side walls and end walls, the latter being provided with overhanging portions and forwardly extended arms, the metal forming said side walls being doubled upon itself and bent up against said arms, and a follower located in said box.

This specification signed and witnessed this twenty-third day of May A. D. 1908.

FRANK F. SAYLES.

Witnesses:
M. TURNER,
E. M. DASO.